Mar. 6, 1923.
Z. O. RARRICK.
BURNER.
FILED JULY 22, 1921.
1,447,571.
2 SHEETS—SHEET 1.
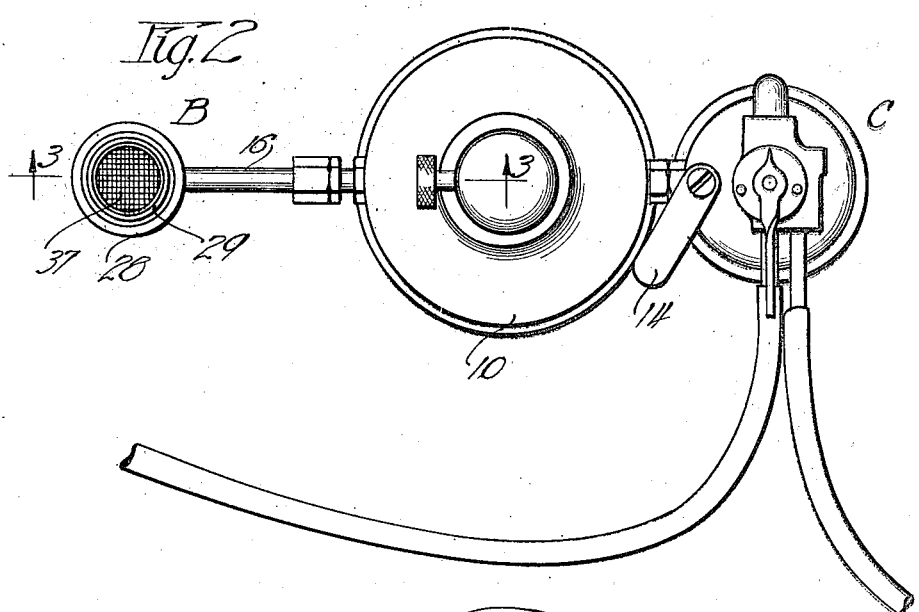
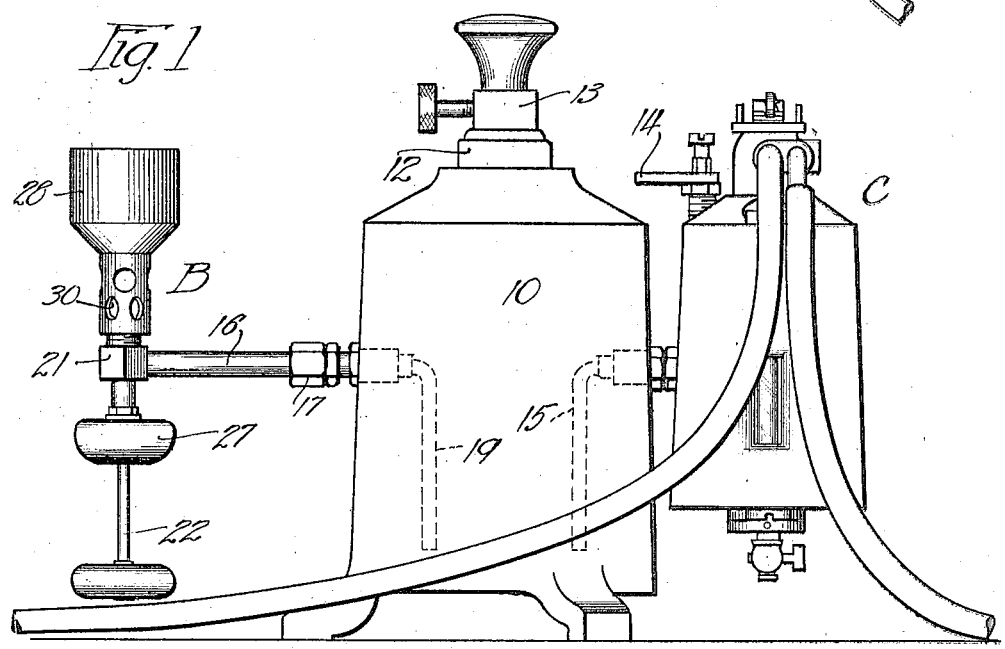
Inventor
Zerne O. Rarrick
Williams, Bradbury,
See & McCalb   Attys.

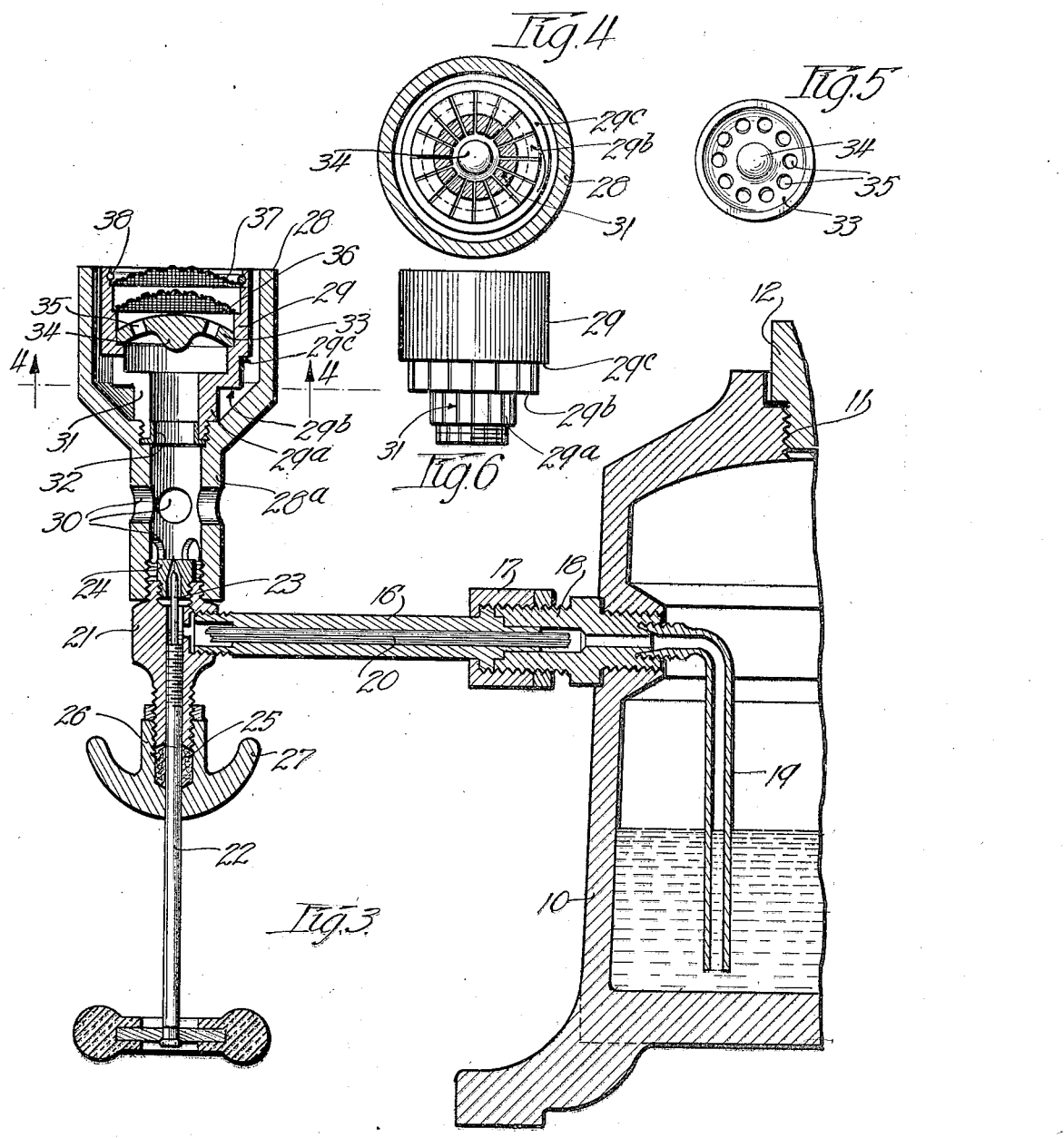

Patented Mar. 6, 1923.

1,447,571

UNITED STATES PATENT OFFICE.

ZERNE O. RARRICK, OF TOLEDO, OHIO, ASSIGNOR TO THE RANSOM & RANDOLPH COMPANY, OF TOLEDO, OHIO, A CORPORATION OF OHIO.

BURNER.

Application filed July 22, 1921. Serial No. 486,686.

*To all whom it may concern:*

Be it known that I, ZERNE O. RARRICK, a citizen of the United States, and resident of Toledo, in the county of Lucas and State of Ohio, have invented a certain new and useful Improvement in Burners, of which the following is a full, clear, concise, and exact description, reference being had to the accompanying drawings, forming a part of this specification.

My invention relates to a burner that is particularly adapted to form part of a heating appliance suitable for use in dentists' laboratories. The invention consists in a novel construction and arrangement of the several parts of the burner with a view to producing a heating device that will operate successfully and indefinitely on low grade hydrocarbon fuel, such as present day commercial gasoline.

Low grade gasoline tends to carbonize within and block any small passage through which it travels if such passage is subjected to any considerable degree of heat. The formation of carbon in that part of a dentists' gasoline heating appliance which connects the burner with the gasoline tank is very annoying and is one of the most serious objections to the several styles of dentists' gasoline appliances heretofore placed upon the market. This difficulty is overcome when the improvements of my present invention are employed. The burner of my invention is so constructed that practically none of the heat resulting from the combustion of the fuel is conducted to the metal parts of the passage which affords communication between the burner and its associated gasoline tank. Those parts of my device which are subject to carbonization are very accessible and easy to clean.

Other objects and advantages of my invention will appear as the following detailed description progresses.

In the accompanying drawings, illustrating my invention,

Figure 1 is a side elevational view of a gasoline heating appliance embodying my invention;

Figure 2 is a top plan view of the same;

Figure 3 is a vertical sectional view illustrating the interior construction of those parts of the appliance with which my present invention is particularly concerned;

Figure 4 is a horizontal sectional view taken on line 4—4 of Figure 3;

Figure 5 is an isolated bottom view of the burner cap; and

Figure 6 is a side elevational view of the inner burner member.

Similar characters of reference refer to similar parts throughout the several views.

In Figures 1 and 2 I have illustrated a heating appliance comprising a closed tank 10 adapted to contain a supply of gasoline or other liquid hydrocarbon. The supply of hydrocarbon to the tank is replenished through opening 11 which is normally closed by a plug 12. Plug 12 carries an air pump 13 by means of which air may be pumped into the tank to place the liquid hydrocarbon under pressure. Tank 10 serves to supply fuel to a burner indicated as a whole at B and to a carburetor illustrated at C. Carburetor C may be supplied with fuel from tank 10 by proper manipulation of the valve controlled by valve operating handle 14. Said valve normally shuts off communication between tank 10 and the carburetor, but when said valve is open, the air under pressure in tank 10 forces liquid hydrocarbon through conduit 15 to replenish the supply of hydrocarbon in the carburetor C.

The general arrangement of tank, pump, burner and carburetor illustrated in Figures 1 and 2 is old in the art to which my invention relates, this general arrangement of parts being the characteristic feature of the well-known "Brophy" gasoline appliance shown and described in United States Letters Patent Number 760,099, granted to Reuben C. Brophy on May 17, 1904. So far as my present invention is concerned, the details of the carburetor are immaterial, but I prefer to employ a carburetor embodying the improvements described and claimed in my co-pending application Serial Number 486,687, filed July 22, 1921.

At 16 I have illustrated a metal conduit which affords communication between tank 10 and burner B. A sleeve 17 clamps the shouldered end of conduit 16 against the outer end of a hollow plug 18, the plug 18 being tightly threaded into an aperture in the side wall of tank 10. A pipe 19 affords communication between plug 18 and a point below the level of fuel in tank 10 and preferably near the bottom thereof. Conduit 16 contains the usual fine metal wires indicated at 20. That end of conduit 16 which lies away from the tank is threaded into a valve housing 21 and communicates with the vertical bore of the latter. Threaded into valve housing 21 is a valve stem 22 which is provided with a reduced and pointed upper end 23 constituting a needle valve arranged to co-operate with the seat provided by the conical bore of a plug 24. Plug 24 is preferably threaded into the upper end of housing 21, as shown. A packing gland 25 prevents downward escape of fuel around valve stem 22. The nut 26 which holds packing 25 in position is preferably provided with an up-turned annular flange 27 which provides a receptacle for fuel used for preheating the burner parts. The burner comprises two principal parts,—namely, a substantially funnel-shaped or outer member 28 and an inner member 29. The portion $28^a$ of funnel-shaped member 28 is provided with a plurality of air holes 30—30 and is provided with internal screw threads co-operating with external screw threads on the upper end of valve housing 21.

The burner element 29 is hollow and is provided with a lower tubular portion $29^a$ and annular external shoulders $29^b$ and $29^c$. The lower end of the tubular portion $29^a$ is reduced in diameter and provided with external threads co-operating with internal threads in the upper end of portion $28^a$ of the funnel-shaped member. It will be noted that element 29 lies within but is spaced from the inclined and cylindrical walls of element 28. Communiction between the interior of element 29 and the space between elements 28 and 29 is afforded by a plurality of slots or saw cuts 31—31 which are formed in the lower portion of element 28, as is clearly shown in Figures 3, 4 and 6. I find it desirable to force an internal ferrule 32 into the lower end of the burner element 28 to prevent the partially severed portions of the same from being forced inwardly and broken off when member 29 is threaded into the member 28, as illustrated.

Resting upon one of the internal shoulders of burner member 29 is a circular cap 33 which is upwardly dished and is provided on its lower surface with a centrally located downwardly projecting boss 34. Formed in the cap 33 and located around the boss 34 is a plurality of apertures 35. A pair of screens or perforated discs 36 and 37 are disposed above cap 35 and rest upon internal annular shoulders of member 29. The upper screen is preferably held against displacement by a split ring retainer indicated at 38.

Prior to using the burner the pump 13 is operated to create a sufficient pressure within tank 10. The burner elements 28 and 29 are then heated either by directing a blow pipe flame against element 28 or by burning gasoline or other fuel in the trough provided by flange 27. When the burner elements have been properly preheated, the needle valve 23 is unseated to admit fuel to the lower portion of burner element 28. The admitted fuel rises through the aligned passages of burner elements 28 and 29 and mixes with air entering through openings 30—30. The rising combustible mixture impinges against the boss or hot spot 34 and a considerable portion of the combustible mixture is deflected outwardly and downwardly from said boss and passes through the slots 31—31 into the annular space between the burner members 28 and 29. When the combustible mixture is first ignited at the top of the burner, two distinct flames are noticeable, one flame rising from the screen 37 and the other from the annular space between the burner members 28 and 29. After the burner parts have become very hot the flame resulting from combustion in the annular space between the burner members 28 and 29 is not noticeable, or not particularly noticeable, at the top of the burner, and the flame rising above screen 37 has become more intense. This action is no doubt due to the fact that, after the burner parts become very hot, volatilization of the hydrocarbon improves and a greater portion of the combustible mixture escapes upwardly through the apertures 35 than is the case when the combustible mixture is first ignited at the top of the burner. It is a fact, however, that a considerable portion of the combustible mixture is always deflected through the slots 31—31 and burns in the space between members 28 and 29, the flame from such combustion impinging against shoulders $29^b$ and $29^c$ and serving to heat the burner member 29 and its cap 33 to a very high temperature.

The arrangement described not only enables me to secure an exceedingly effective flame above the screen 38, but furthermore prevents the conduit 16 from being heated to the extent necessary to cause a deposit of carbon around the wires 20. The burner member 29 becomes intensely hot, but so much of the heat from burner member 29 as is conducted to burner element 28 is almost entirely dissipated by radiation from member 28. Member 28 has a very large external surface and such heat as is absorbed thereby is so rapidly radiated to the surrounding atmosphere that but an insignificant amount of heat is permitted to reach the conduit 16 by conduction. The temperature of conduit 16 remains surprisingly low, even after the burner has been in operation for a very considerable length of time, and as a result, the annoyance resulting from the deposit of carbon around wires 20—20 is eliminated, or practically eliminated. The only parts of the device upon or in which any substantial quantities of carbon are deposited are the members 28 and 29 and the cap 33. These parts are readily accessible and may be easily cleaned when occasion requires.

The herein described burner of my invention is characterized by the fact that it is practically noiseless in operation. This result is undoubtedly attributable to the baffling effect resulting from the conformation and construction of the several parts of the inner burner member.

While I have illustrated the burner of my invention as forming part of a gasoline appliance of the "Brophy" type, my burner is in no way limited to use in this connection. I do not limit myself to the details of construction herein shown and described, but claim all equivalent arrangements falling within the terms or spirit of the appended claims.

What I claim is new and desire to secure by Letters Patent of the United States is:

1. A burner comprising two hollow members both open at the top and disposed one within the other with a space between them, a heating element within the inner hollow member, and means for admitting a combustible mixture of air and hydro-carbon to the lower end of the inner member, there being openings in the lower part of the inner member to permit a minor portion of the combustible mixture entering the inner member to pass therefrom into the space between said members.

2. A burner comprising two hollow members both open at the top and disposed one within the other with a space between them, and means for admitting a combustible mixture of air and hydro-carbon to the lower end of the inner member, there being openings in the lower part of the inner member to permit a minor portion of the combustible mixture entering the inner member to pass therefrom into the space between said members, the inner member being provided on its outer surface with a shoulder whereon impinges the flame resulting from combustion in the space between said members.

3. A burner comprising two hollow members both open at the top and disposed one within the other with a space between them, and means for admitting a combustible mixture of air and hydro-carbon to the lower end of the inner member, there being openings in the lower part of the inner member to permit a minor portion of the combustible mixture entering the inner member to pass therefrom into the space between said members, together with an apertured horizontal wall in the inner member provided on its lower surface with a central boss located opposite the point where the combustible mixture is admitted to said inner chamber.

4. A burner of the class described comprising a hollow member open at top and bottom and provided with annular shoulders on its outer surface, a second hollow member open at the top and disposed around and spaced from the first member, means for admitting a combustible mixture of air and hydro-carbon to the lower portion of the first member, and openings in the lower portion of the first member adapted to permit a part of the combustible mixture entering the first member to pass into the space between said members and there sustain a flame impinging upon said shoulders.

5. A burner of the class described comprising a hollow member open at top and bottom and provided with annular shoulders on its outer surface, a second hollow member open at the top and disposed around and spaced from the first member, means for admitting a combustible mixture of air and hydro-carbon to the lower portion of the first member, and openings in the lower portion of the first member adapted to permit a part of the combustible mixture entering the first member to pass into the space between said members and there sustain a flame impinging upon said shoulders, and an upwardly dished and apertured horizontal wall in said inner member, said wall provided with a downwardly projecting central boss located directly above the point where the combustible mixture is admitted to the inner member.

6. A burner comprising means providing an inner chamber open at the top, and an outer chamber open at the top, closed at the bottom and lying around said inner chamber, shoulders on the outer surface of the wall of said inner chamber, and means for admitting a combustible mixture of air and hydro-carbon to the lower portion of the inner chamber, there being openings in the lower portion of the wall of the inner chamber to permit a part of the combustible mixture entering the inner chamber to pass into the outer chamber and there sustain a flame impinging upon said shoulders.

7. A burner comprising means providing an inner chamber open at the top, and an outer chamber open at the top, closed at the bottom and lying around said inner chamber, a transversely extending heating element within said inner chamber, and means for admitting a combustible mixture of air and hydro-carbon to the bottom of the inner chamber, there being openings in the lower portion of the wall of the inner chamber through which a part of the combustible mixture entering the inner chamber may pass into the outer chamber and there sustain a flame to heat the wall of the inner chamber to a high temperature.

8. A burner comprising means providing an inner chamber open at the top, and an outer chamber open at the top, closed at the bottom and lying around said inner chamber, and means for admitting a combustible mixture of air and hydro-carbon to the bottom of the inner chamber, there being openings in the lower portion of the wall of the inner chamber through which a part of the combustible mixture entering the inner chamber may pass into the outer chamber and there sustain a flame to heat the wall of the inner chamber to a high temperature, said inner chamber being provided at a point intermediate the top and bottom thereof with an upwardly dished, apertured, horizontal wall.

9. A burner comprising means providing an inner chamber open at the top, and an outer chamber open at the top, closed at the bottom and lying around said inner chamber, and means for admitting a combustible mixture of air and hydro-carbon to the bottom of the inner chamber, there being openings in the lower portion of the wall of the inner chamber through which a part of the combustible mixture entering the inner chamber may pass into the outer chamber and there sustain a flame to heat the wall of the inner chamber to a high temperature, said inner chamber being provided at a point intermediate the top and bottom thereof with an upwardly dished, apertured, horizontal wall, said wall being provided with a centrally located, downwardly projecting boss disposed above and opposite the point where combustible mixture is admitted to the inner chamber.

10. A burner of the class described comprising a funnel shaped member communicating at its lower end with a conduit leading from a source of hydro-carbon supply, a hollow member open at top and bottom and disposed in the top of the funnel shaped member with the bottom openings of said hollow member communicating with the passage through the lower portion of the funnel shaped member, there being an annular space between the aforesaid funnel shaped member and said hollow member, a heating element positioned within and transversely of said hollow member, and openings in the lower portion of the hollow member affording communication between the hollow member and said annular space.

11. A burner of the class described comprising a funnel shaped member communicating at its lower end with a conduit leading from a source of hydro-carbon supply, a hollow member open at top and bottom and disposed in the top of the funnel shaped member with the bottom opening of said hollow member communicating with the passage through the lower portion of the funnel shaped member, there being an annular space between the aforesaid funnel shaped member and said hollow member, and openings in the lower portion of the hollow member affording communication between the hollow member and said annular space, together with an apertured, horizontal wall in the inner member provided with a downwardly projecting central boss located directly opposite the passage in the lower portion of the funnel shaped member.

12. A burner of the class described comprising a funnel shaped member communicating at its lower end with a conduit leading from a source of hydro-carbon supply, a hollow member open at top and bottom and disposed in the top of the funnel shaped member with the bottom openings of said hollow member communicating with the passage through the lower portion of the funnel shaped member, there being an annular space between the aforesaid funnel shaped member and said hollow member, and openings in the lower portion of the hollow member affording communication between the hollow member and said annular space, together with an apertured, horizontal wall in the inner member provided with a downwardly projecting central boss located directly opposite the passage in the lower portion of the funnel shaped member, the said inner or hollow member being provided on its outer surface with a horizontal shoulder whereon a flame resulting from combustion in said annular chamber may impinge.

13. A burner of the class described comprising a funnel shaped member connected at its lower end with a conduit leading from a source of hydro-carbon supply, openings in the lower portion of said funnel shaped member for the admission of air, a hollow member open at top and bottom and of less diameter than the flaring portion of the funnel shaped member, said hollow member being disposed in the upper or flaring portion of the funnel shaped member and being secured to the latter with the bottom opening of said hollow member registering with the opening through the lower portion of the funnel shaped member, an upwardly dished and apertured horizontal wall in the hollow member, a downwardly projecting central boss carried by said wall, and located above and opposite the passage through the lower portion of the funnel shaped member, and horizontal shoulders on the outer surface of the hollow member, there being slots in the lower portion of the hollow member through which a part of the combustible mixture entering said hollow member may pass into the space around said hollow member and there sustain a flame impinging upon said shoulder.

In witness whereof, I hereunto subscribe my name this 28th day of June, 1921.

ZERNE O. RARRICK.

Witnesses:
J. W. JENNINGS,
K. S. MANN.